US009671941B1

(12) United States Patent
Gray et al.

(10) Patent No.: US 9,671,941 B1
(45) Date of Patent: Jun. 6, 2017

(54) GRAPHICAL BEHAVIORS FOR RECOGNITION INTERFACES

(71) Applicant: Amazon Technologies, Inc., Reno, NV (US)

(72) Inventors: Timothy Thomas Gray, Seattle, WA (US); Charles Eugene Cummins, Seattle, WA (US); Russell Edward Glaser, Woodinville, WA (US); Tito Pagan, Redmond, WA (US); Steven Michael Sommer, Bellevue, WA (US); Brian Peter Kralyevich, Kenmore, WA (US); Angela Kathleen Warren, Shoreline, WA (US); Marc Anthony Salazar, Seattle, WA (US); Suzan Marashi, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 333 days.

(21) Appl. No.: 14/137,674

(22) Filed: Dec. 20, 2013

Related U.S. Application Data

(60) Provisional application No. 61/821,677, filed on May 9, 2013.

(51) Int. Cl.
  *G06F 3/048* (2013.01)
  *G06F 3/0484* (2013.01)
  *G06F 3/01* (2006.01)

(52) U.S. Cl.
  CPC .......... *G06F 3/04845* (2013.01); *G06F 3/016* (2013.01); *G06F 3/04842* (2013.01); *G06F 2203/04801* (2013.01)

(58) Field of Classification Search
  CPC .... G06F 3/016; G06F 3/0488; G06F 3/04886; G06F 3/04845; G06F 3/04842; G06F 2203/04801
  USPC ........ 715/702, 764, 802, 821, 822, 823, 861
  See application file for complete search history.

(56) References Cited

U.S. PATENT DOCUMENTS

| 2002/0087329 | A1* | 7/2002 | Massaro | G06T 13/205 704/275 |
| 2004/0120574 | A1* | 6/2004 | Rosenholtz | G06K 9/2054 382/165 |
| 2008/0091553 | A1* | 4/2008 | Koski | G06Q 30/02 705/26.8 |

(Continued)

*Primary Examiner* — Abdullah Al Kawsar
*Assistant Examiner* — Jian Yu
(74) *Attorney, Agent, or Firm* — Pierce Atwood LLP

(57) ABSTRACT

A computing device can utilize a recognition mode wherein an interface utilizes graphical elements, such as virtual fireflies, to indicate recognized or identified objects. Fireflies can be displayed near an input element to indicate that a recognition mode is available. When a user selects the input element, the fireflies can appear to emanate from the input element and disperse across the display screen. As objects are recognized, fireflies can create bounding boxes around those objects, or otherwise appear proximate those objects, to indicate recognition. The fireflies can again disperse as the objects fall out of view, and can begin moving towards new objects as features of those objects are identified as potential object features. A subsequent selection of the input element to exit recognition mode can cause the fireflies to appear to retreat to their original location in, or near, the input element.

19 Claims, 11 Drawing Sheets

(56) References Cited

U.S. PATENT DOCUMENTS

| | | | | |
|---|---|---|---|---|
| 2008/0126975 A1* | 5/2008 | Vassigh | ............... | G06F 3/04895 |
| | | | | 715/772 |
| 2009/0158151 A1* | 6/2009 | Cheng | .................... | G06N 3/006 |
| | | | | 715/706 |
| 2011/0164163 A1* | 7/2011 | Bilbrey | ................. | G06F 1/1694 |
| | | | | 348/333.01 |
| 2012/0192048 A1* | 7/2012 | Suzuki | ................... | G06Q 30/00 |
| | | | | 715/205 |

* cited by examiner

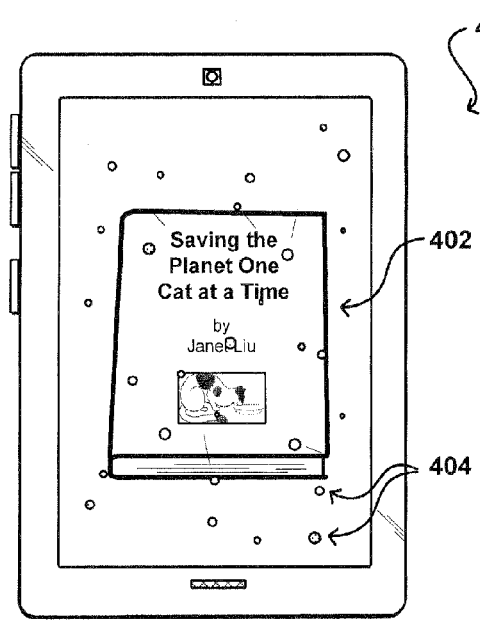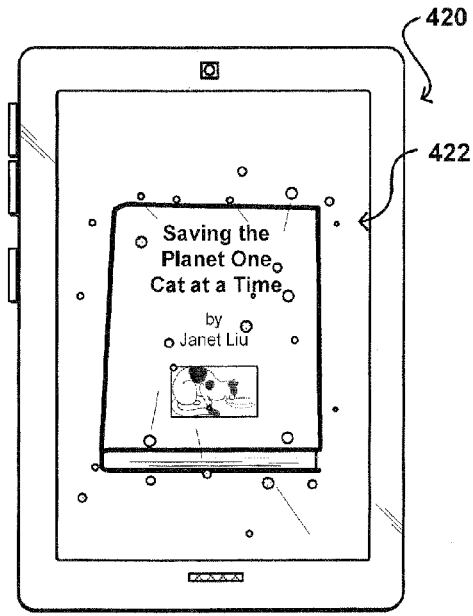
FIG. 4(a)          FIG. 4(b)
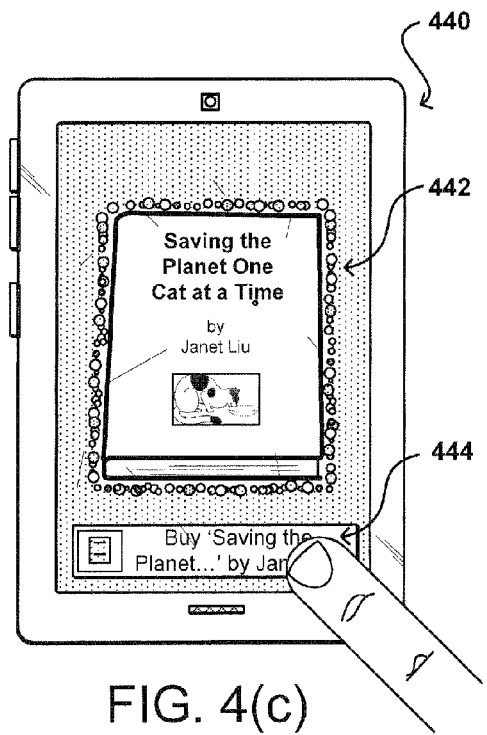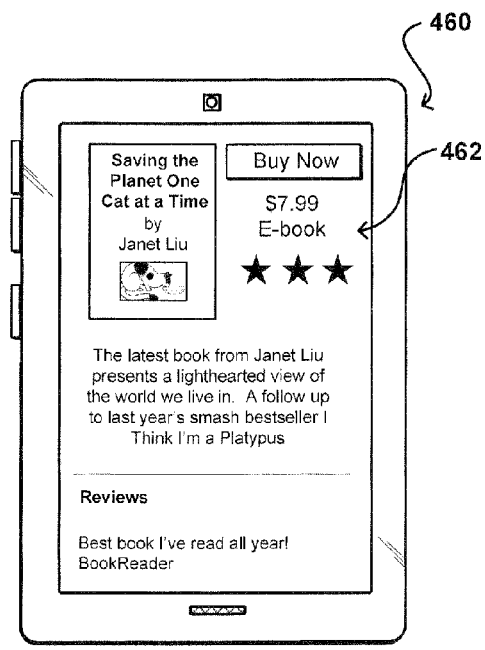
FIG. 4(c)          FIG. 4(d)

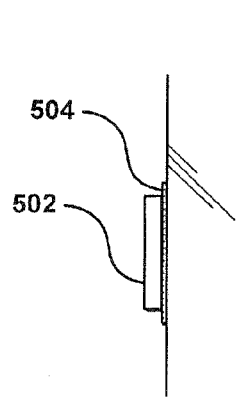 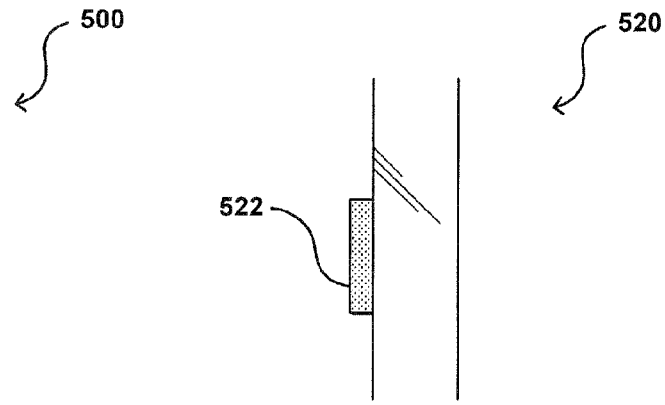
FIG. 5(a)    FIG. 5(b)
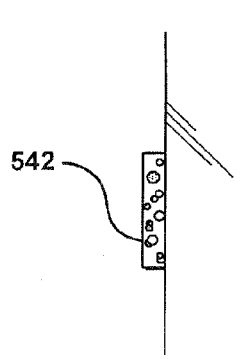 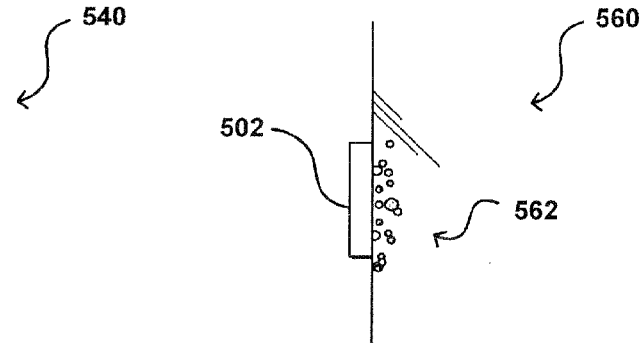
FIG. 5(c)    FIG. 5(d)
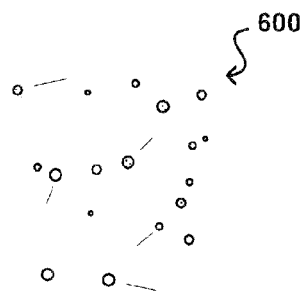 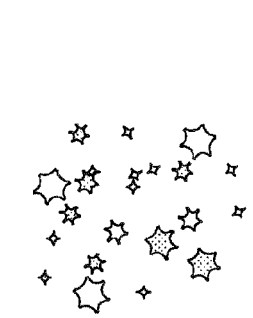 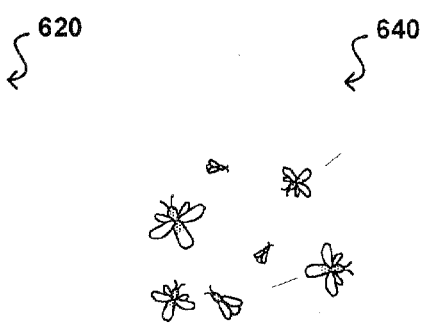
FIG. 6(a)    FIG. 6(b)    FIG. 6(c)

- Front -     - Back -

GRAPHICAL BEHAVIORS FOR RECOGNITION INTERFACES

CROSS-REFERENCE TO RELATED APPLICATIONS

This application claims priority to U.S. Provisional Patent Application Ser. No. 61/821,677, entitled "Mobile Device User Interface—Camera," filed May 9, 2013, which is hereby incorporated herein by reference, in its entirety and for all purposes.

BACKGROUND

People are increasingly utilizing portable electronic devices to perform a wide variety of tasks. As an example, people can utilize a camera of such a device to capture an image of an object. For example, a user can use a camera to capture a still image or video on things in the environment in the camera's field of view. There might be multiple objects in an image or video, and the user may not be able to determine what the objects are or know much about them.

BRIEF DESCRIPTION OF THE DRAWINGS

Various embodiments in accordance with the present disclosure will be described with reference to the drawings, in which:

FIGS. 4(a), 4(b), 4(c), and 4(d) illustrate an example interface enabling a user to perform an action for a recognized object that can be utilized in accordance with various embodiments;

FIGS. 5(a), 5(b), 5(c), and 5(d) illustrate example button configurations that can be used to provide information to a user in accordance with various embodiments;

FIGS. 6(a), 6(b), and 6(c) illustrate example graphical elements that can be used to provide information to a user in accordance with various embodiments;

DETAILED DESCRIPTION

Figure 1A:
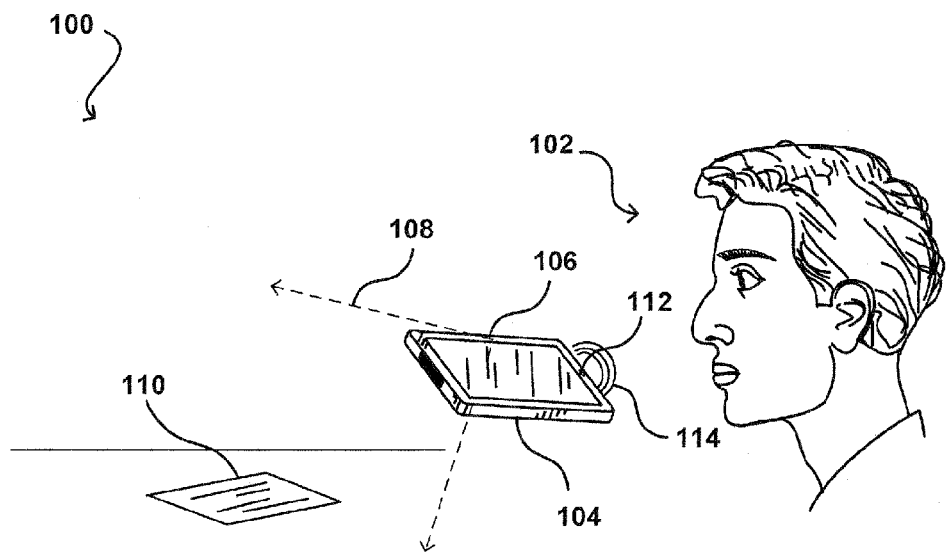
FIGS. 1(a) and 1(b) illustrates an example of a user using a portable computing device to capture an image of an object that can be utilized in accordance with various embodiments.

Systems and methods in accordance with various embodiments of the present disclosure may overcome one or more of the aforementioned and other deficiencies experienced in conventional approaches to imaging objects in the environment and learning more about them. In particular, various embodiments enable a computing device to indicate by presenting dynamic, intuitive graphical interfaces when aspects of the environment is being or can be analyzed by the device. For example, graphical interfaces applying a consistent graphical theme can be used to indicate when there is sensor data being or able to be acquired by one or more sensors of the computing device, thereby enabling the user to use the computing device to attempt to identify one or more objects contained, or otherwise represented, in the information. Sensor data can include, for example, images or video data acquired by a camera, audio acquired by a microphone, position data acquired by a global positioning system, and any other appropriate data capable of being acquired by one or more sensors (or other such components) of a computing device. The objects can include tangible and/or intangible objects, such as may include, for example, text strings, bar codes, songs, movies, products, weather-related information, and other types of items, events, and/or occurrences. Various embodiments also provide an interface that enables the device to convey which objects in the information have been recognized, such as by displaying a set of virtual "fireflies" or other types of graphical elements over a live view of image (e.g., video) data being acquired by the device. The fireflies, or other such graphical elements, can be activated in at least some embodiments when one or more objects might be identifiable by the device. The fireflies can be animated or otherwise configured to appear to gather by, be contained in, or otherwise associated with at least one launch button, for example, which may include a physical hardware button, a virtual button displayed on a touch screen, or another such user-selectable element. When the user presses the launch button, for example, the fireflies can be rendered or otherwise caused to appear to emanate or otherwise disperse from the button, or a region of the display near the button, and disperse across at least a larger portion of the display. As objects are recognized, the computing device can be configured to cause at least some of the fireflies to indicate the recognition, such as by creating a dynamic bounding box around a representation of each such object or forming an appropriate shape on the display. When a user subsequently presses the launch button again, such as to cause the device to leave a recognition mode or other state of operation, the fireflies can be animated such that they appear to return to their previous associated with the launch button.

Various other applications, processes, and uses are presented below with respect to the various embodiments.

FIG. 1(a) illustrates an example situation 100 wherein a user 102 is interacting with a computing device 104. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 102 is interested in obtaining information about a particular document 110. This could include, for example, information contained in the document or information about the document itself, among other such information. The device can include other sensors for capturing information as well, such as at least one microphone 112 operable to capture audio data 114 or a position sensor for acquiring position data, among others.

In this example, the document 110 contains information that might be of interest to the user. This information includes, for example, a body of text, a phone number, and a web address. The user might want to acquire any or all of this information for any of a number of reasons, such as to update contact information, call the number, access a Web site associated with the address, and so on. In order to obtain this information, the user can position the computing device 104 such that at least the relevant portion of the document 110 is within a field of view 108 of at least one camera 106 of the computing device. The resulting image can then be displayed on a display screen 122 of the computing device, as illustrated in the example situation 120 of FIG. 1(*b*). The image 122 can be a still image that was captured by the camera, or can be a frame of a "live" view as captured by a video mode of the camera, camera mode of the device, etc. As illustrated, the image 122 can include information 124 from the document. Each instance of captured information can be referred to as a representation of an "object," which can be analyzed by software running on, or remote from, the device. In this example, the objects that can be recognized from representations of those objects in the image can include objects such as a string of text 126, a phone number 128, and a web address or URL 130. Various other types of objects can be recognized in other examples as discussed and suggested elsewhere herein. The image can be processed to attempt to recognize the text, which then can be utilized by the user for any of a number of different purposes.

Using a conventional approach, the user can cause the image to be captured and uploaded to a server that is capable of running one or more image recognition or analysis algorithms on the image to attempt to identify text within the image. This can include, for example, at least one optical character recognition (OCR) algorithm. Oftentimes, however, the image that is captured will not be of sufficient quality to recognize the object that is of interest to the user. For example, the image might be out of focus or blurry, or part of the image might be obscured. Further, sometimes the recognition algorithm will only be able to recognize a portion of the image, which may or may not include the portion that is of interest to the user. Since the user is uploading the image to a server, the user has to wait for the image to be uploaded and analyzed before determining whether the relevant information was recognized, and whether it was recognized properly. If not, the user must cause another image to be analyzed and hope that the desired result is returned. This process can be inefficient and potentially frustrating to a user.

Accordingly, approaches in accordance with various embodiments can provide an interface that enables a user to determine which objects have been recognized, such that the user can make near real-time adjustments in order to cause the device to recognize the object(s) of interest. Such an interface can indicate each such object that has been recognized, and can provide information about that object as applicable. Further, if that object is an actionable object, or a type of object with which an action is associated, for example, the interface can enable that action (or any of a number of associated actions) to be performed with respect to the object. In at least some embodiments, information for these actions can be retained or archived such that a user can cause that action to be performed whether or not the object is still recognizable by the device. This can include, for example, a situation where the object is no longer in a field of view of a camera or detectable by a microphone or other sensor or component of the device. Such an interlace can be provided as part of the operating system, as part of the camera software/hardware, or as part of an application sitting on top of the camera stack, among other such options.

Figure 1B:
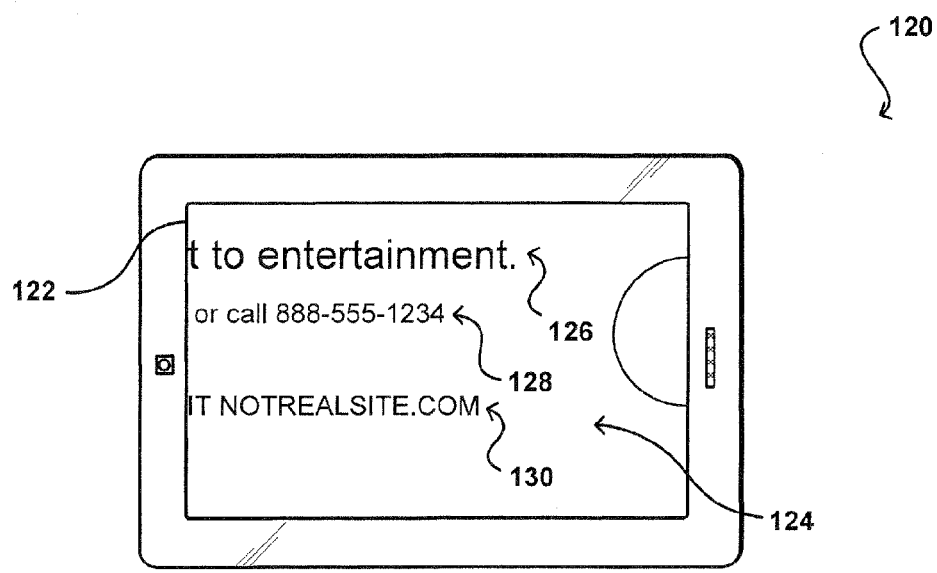

For example, FIG. 2(*a*) illustrates an example situation 200 wherein the portion of the image from FIG. 1(*b*) is again displayed as a live view of the document of interest to the user. In this example, however, the user is able to press a physical button 202, or provide another such physical or virtual input, to cause a recognition mode to activate on the device. As discussed elsewhere herein, a computing device can generate video data while in a camera mode, but can also attempt to analyze that data to recognize one or more objects while in a recognition mode. It should be understood that other types of operation for recognition or other such purposes can be utilized as well, and that other activation mechanisms can be used or the recognition can be launched automatically, among other such options. In this example, the recognition mode (as well as the camera mode in at least some embodiments) uses what will be referred to herein as "fireflies" 208. The fireflies can be animated to function as a set of virtual indicators that can "float" above a live camera view, still image, or other such content presented via a display 204 or other such element of the computing device. Fireflies can be used to communicate information to the user, such as whether the device is tracking objects properly or if tracking has been lost, whether or not objects are recognized, and/or whether the image is adequate to identify features in the image, among other such options. Each firefly can be a group of pixels that pulsate or alternate in brightness like a firefly, or can comprise an actual image or animation of a firefly, bulb, insect, or other such creature or object that can move about the screen. Various other objects, icons, images, animations, or graphics can be used as well within the scope of the various embodiments.

Some fireflies can be animated to move about the screen, while some can be caused to appear to flash in place, either once or a number of times. There can be a fixed number of fireflies on a screen at any given time, or a variable number that can depend on any of a number of different factors. There can be some fireflies that flash in place while other fireflies move, in order to give the impression of a group of living organisms without the impression of swarming or other motions that may be somewhat disconcerting to a user. In some embodiments, the fireflies can be small points or circles that flash from invisible or transparent to a bright white or yellow light, for example, similar to how fireflies light in nature. Other appearances can be used as well, along with different colors, sizes, brightness values, etc. In order to give a more natural appearance, different fireflies on the same display might also have different brightness levels, intensities, colors, distances, sizes, and the like. In at least some embodiments a user (or developer or application, etc.) can be enabled to change the appearance or behavior of the fireflies, among other such aspects. When entering a recognition mode, in at least some embodiments, any chrome or interface associated with the camera can be removed, reduced in size or scope, or otherwise modified to further indicate that the device has entered a different mode of operation. In at least some embodiments, the audio of the device can also be adjusted when fireflies perform different operations, such as to emit a louder buzzing noise when moving or emit little to no buzzing when a bounding box is created. Further, different buzzing sounds can be used when fireflies are animated differently, such as to display a first buzzing noise (or provide a first amount of vibration) when the fireflies are animated to disperse across at least a portion of a display, and a different buzzing noise (or amount of vibration) when the fireflies are proximate a representation of an object or a launch button, among other such options.

Figure 2A:
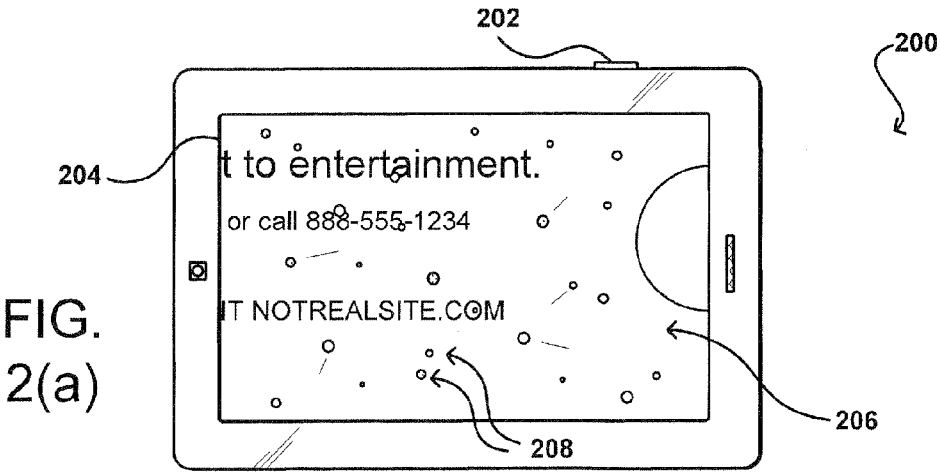
FIGS. 2(a), 2(b), 2(c), 2(d), and 2(e) illustrate an example interface that conveys to a user which objects are recognized in a current view, as well as actions that can be accomplished using those objects, that can be utilized in accordance with various embodiments.
Figure 2B:

In at least some embodiments, the fireflies can be animated, rendered, or otherwise caused to appear to act with at least some level of intelligence. For example, as illustrated in FIG. 2(a), while no part of the image information 206 has been recognized, the fireflies can be caused to relatively randomly move or hover about the screen (as completely random movement may not appear natural). There can be some related behavior among the movements in at least some embodiments to give the impression of a group of intelligent creatures. While the fireflies are moving about the display, for example, the computing device (or a computer in communication with the computing device) can analyze at least a portion of the image and/or video to attempt to recognize one or more objects represented in the image, or "visual representations" of the corresponding objects contained in the image. For example, the text string "to entertainment" might be recognized by an OCR engine or other such component or process. In response to recognizing that object, some or all of the fireflies can be rendered to form an animated shape, such as by being animated to appear to move across the display and form an animated bounding box 222 proximate the representation of the recognized object as illustrated in the example situation 220 of FIG. 2(b). The fireflies in the animated shape can be animated to change in motion and/or appearance, such as by changing in brightness and/or intensity, as well as to change in an amount or type of motion. In some embodiments, fireflies can be animated in a first state when no information is to be conveyed and a second state when information is to be conveyed, where the first and second states can vary in aspects such as maximum brightness, average intensity, color range, average brightness, density, flashing rate, and the like. As mentioned, some of the fireflies might appear to move and some might just appear near the representation of the object in order to prevent the appearance of swarming in at least some embodiments. The result of the fireflies creating a bounding box 222 around the string of text can indicate to the user that the text has been recognized, at least as a string of text or recognizable object. If the user is interested in this text, the user can then take an appropriate action, such as by touching the display 204 near the text or bounding box in order to perform an action such as to copy the text. If the fireflies had not appeared around the text, but instead moved relatively randomly about the display, the user could determine that the image was not sufficient for the device to recognize the text and could perform an action such as to move the camera, move the object, adjust the lighting, change the zoom or focus, etc.

In some embodiments, different recognition algorithms and/or services might be used to recognize different types of objects. For example, a string might be recognized as text that matches a determined pattern, such as a pattern indicating the text is a phone number or URL. Accordingly, information for these objects might be processed by a different algorithm or process. The different types of processing therefore can result, in at least some embodiments, in different objects being recognized at different times. Similarly, different objects might be recognized at different times due to changes in the image that enable different portions to be recognized at different times, among other such options.

Figure 2C:
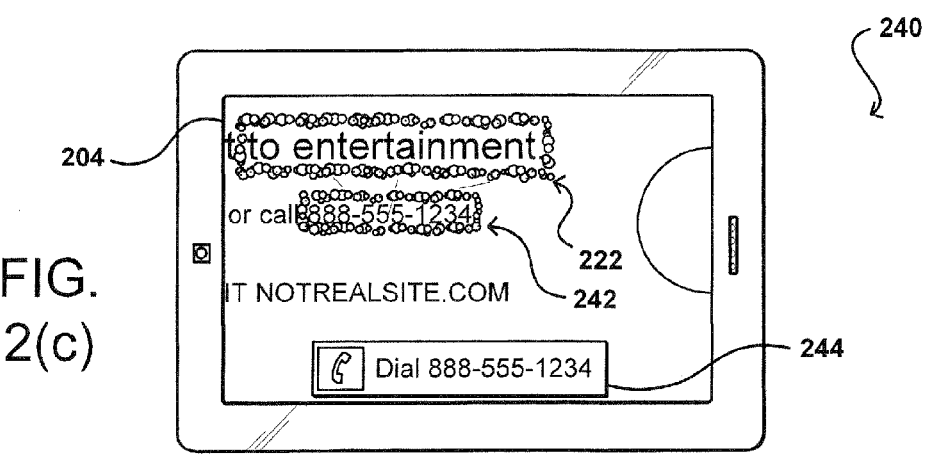

In response to a second object being recognized, as illustrated in the example situation 240 of FIG. 2(c), a portion of the fireflies (either from the first bounding box 222 or additional fireflies, or a combination thereof) can be caused to create a bounding box 242 or other such indication about the second recognized object, here a phone number. In at least some embodiments, some of the fireflies can be animated to move from the first bounding box 222 to the second bounding box 242. Such presentation can indicate to the user that both objects have been recognized and/or identified. In different embodiments, the fireflies can bound the phone number at different times, such as when the string is identified as a text string, when the string is identified as a phone number, or when information for the phone number is located, among other such options. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

In various embodiments, a type of the object can also be determined. In at least some embodiments, this can include at least an "actionable" or a "non-actionable" type, or equivalent(s). For example, a text string such as "to entertainment" might be a portion of text that can be handled as normal text, such as for copying and pasting, which might not be considered an actionable object in at least some embodiments (while being considered actionable in others). Objects such as a phone number or URL might be considered to be actionable objects as the computing device can perform at least one specific function with respect to each of these objects that might be of interest to a user. For each actionable object, every recognized object, or at least one recognized actionable object, for example, the interface can provide a user-selectable input, icon, or element associated with the representation of that object. In other embodiments, a user-selectable input or element might be provided for each recognized object, or a specific subset of recognized objects, among other such options. Objects such as barcodes and QR codes might be considered either actionable or not actionable objects in different embodiments. Similarly, objects such as songs might be considered actionable if the software is linked to a song identification and/or purchasing source, and text might be considered actionable if a translation is available.

In various embodiments, the user-selectable icon can take the form of what will be referred to herein as a "ribbon" 244, although various other types of elements or objects can be utilized as well within the scope of the various embodiments as discussed and suggested elsewhere herein. In this embodiment, a ribbon 244 is comprised of at least two parts: information about the object and information about at least one action that can be taken. As illustrated, the ribbon can list the phone number that was recognized, such that the user can determine whether the phone number was properly recognized before using the number. The ribbon can also identify the action that can be taken, in this case using a phone icon and including the word "dial," although various other indications can be used as well. In some embodiments the user might be able to select from different options or cause a specific action to be associated with a type of object, such as where a user would like to send a text or make a Skype® video call instead of a conventional phone call, among other such options. In some embodiments, a ribbon might have two touch targets: a first target that comprises approximately 80% of the area of the ribbon that enables the user to select the primary action, and a second target of approximately 20% of the ribbon area that enables the user to go to a detail card, or other such element, that provides other actions or plugins applicable to that object, as well as potentially a copy of the image that was used to recognize the object for context, among other such possibilities. As discussed, a ribbon in some embodiments can include at least three things to display: an image relating to the object, a title or name of the object, and a source of disambiguation, such as an author or artist name to help a user distinguish that object from other objects with the same or similar names or titles, etc. Ribbons (or other user-selectable icons) can also provide different actions for various types of objects. For example, a ribbon can include an action to purchase or download a song that was recognized from audio data, or to play a movie that was recognized from audio data and/or video data captured by one or more sensors of the device.

In this example, the ribbon is displayed near the "bottom" of the display for the current orientation, although other places can be utilized as well. In at least some embodiments, the ribbon 244 can remain on the screen for at least a determined period of time, whether or not the corresponding representation of the object is still visible in the display or otherwise accessible to the device. For example, a user might point the camera towards the number in order to have the phone number accessible via the device. Once captured and/or recognized, the user might no longer want to continue to hold the device with the number in the field of view of the camera, and might want to bring the camera to a more comfortable position in order to touch the ribbon or otherwise check and dial the number. In some embodiments, the user might want the device to store the number to dial at a later time that is more convenient for the user. In any of these or other such cases, it can be desirable for the device to display the ribbon for a period of time, or at least enable the user to access the ribbon at the appropriate time.

Figure 2D:
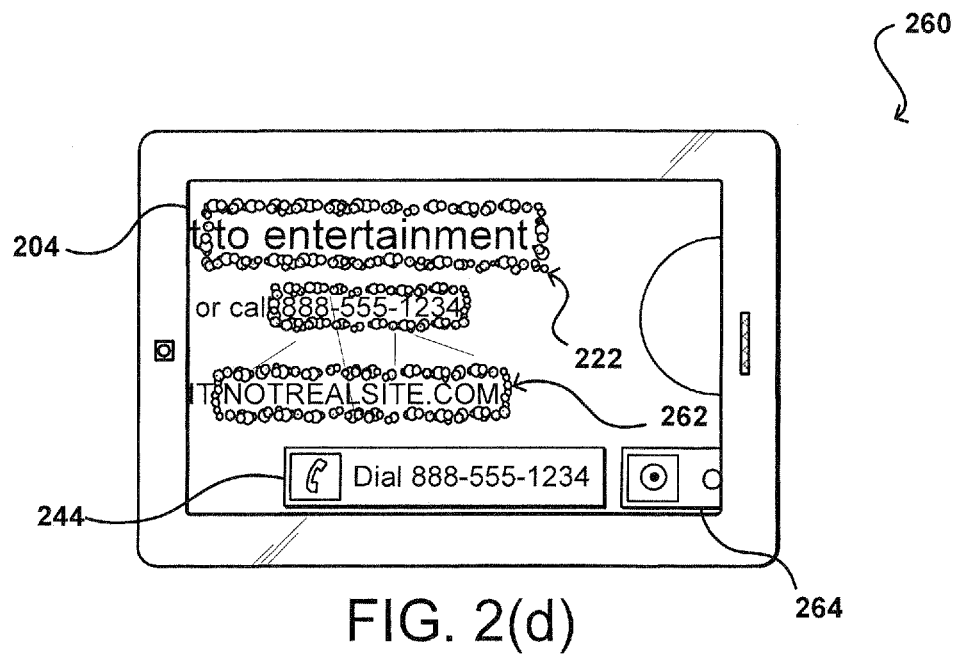

As illustrated in the example situation 260 of FIG. 2(d), the device might recognize additional objects as well, such as by using additional algorithms, plugins, services, or processes or when the portion or quality of the captured image changes, among other such options. In this example, another object is detected, which causes an additional bounding box 262 to be created by the fireflies. Since the object is actionable, an additional ribbon 264 can be created that enables the user to cause a specific action to be performed with respect to the newly recognized object. In some embodiments where multiple actions can be performed with respect to an object, multiple ribbons can be displayed on the display screen. In other embodiments, a ribbon might have more than one label, with each label referring to a different possible action. For example, the sensor data might include a representation of a movie theater sign, a newspaper advertisement, musical sounds and/or various other objects, where a user might want to call (e.g., for reservations/tickets) or learn more information about the object (see artist's website, watch movie trailers, view menu, etc.) before doing so. Labels also can indicate functionality such as an ability to visit a third party's social media page (e.g., a Facebook page for a restaurant or musical artist repre-sented in the poster/ad). In the illustrated example the first ribbon is displayed in a center portion of the display with additional ribbons added to the right, although in other embodiments the newer ribbons can be presented in the center and can be animated to appear to "push" the older ribbons to the right or left, among other such options. In order to access the other ribbons, then, the user can swipe, scroll, or otherwise navigate to those ribbons using any of a number of navigational approaches used for such purposes.

Figure 2E:
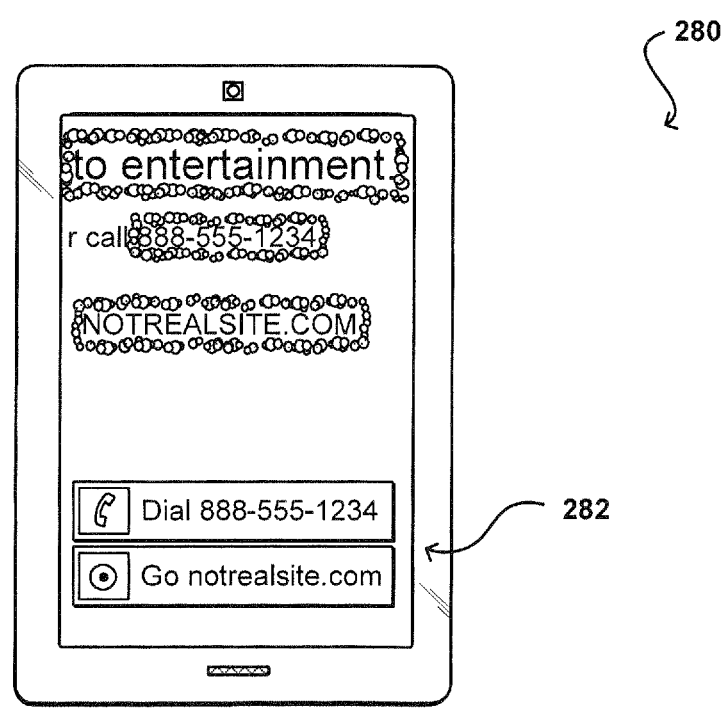

As illustrated in the example situation 280 of FIG. 2(e), the ribbons 282 can also be displayed to appear to be stacked vertically on top of one another, among other such options. In this example, the first ribbon appears on top with the others appearing below, while in other embodiments the most recently generated ribbon can always appear on top, among other such options. As new ribbons are generated and the number of ribbons exceeds the number of ribbons that can be displayed, as may be a fixed, variable, or user-configurable number, for example, the older ribbons can be "pushed" off screen, but available to the user via one or more navigational approaches as discussed elsewhere herein. Various other approaches for displaying, moving, and navigating ribbons or other selectable elements can be utilized as well within the scope of the various embodiments.

Figure 3A:
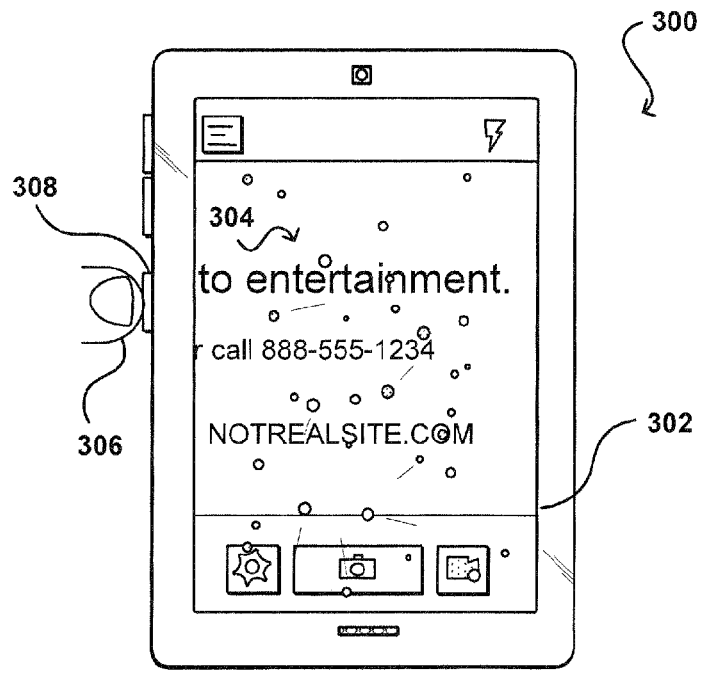
FIGS. 3(a), 3(b), 3(c), 3(d), 3(e), 3(f), 3(g), and 3(h) illustrate an example interface wherein graphical elements such as fireflies can appear to emanate from, and return to, an area near a launch button or other user-selectable element in accordance with various embodiments.
Figure 3B:
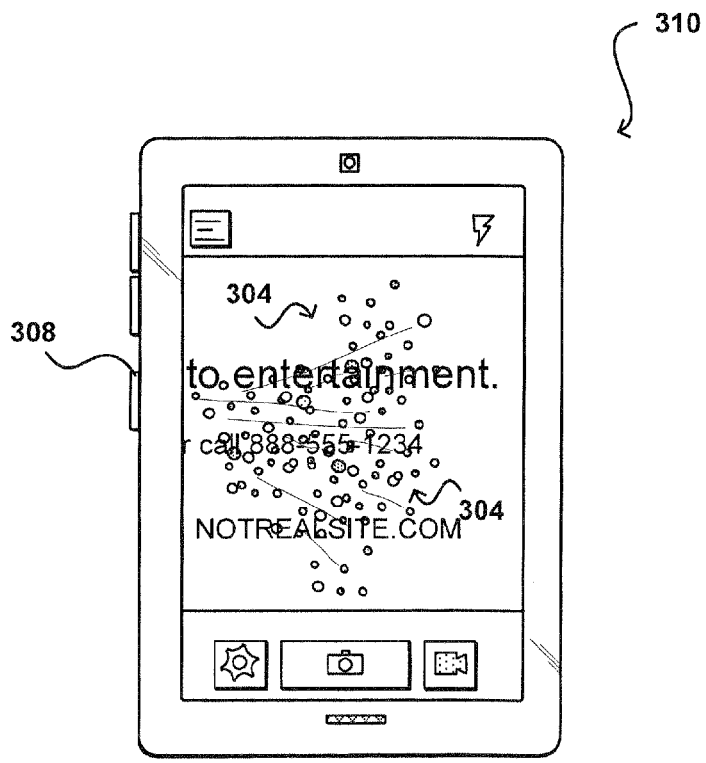
Figure 3C:
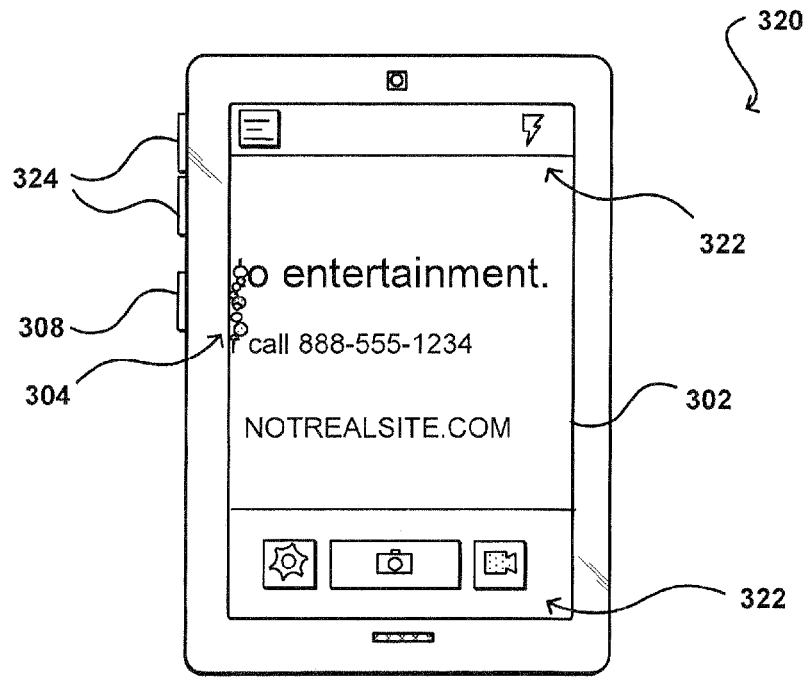
Figure 3D:
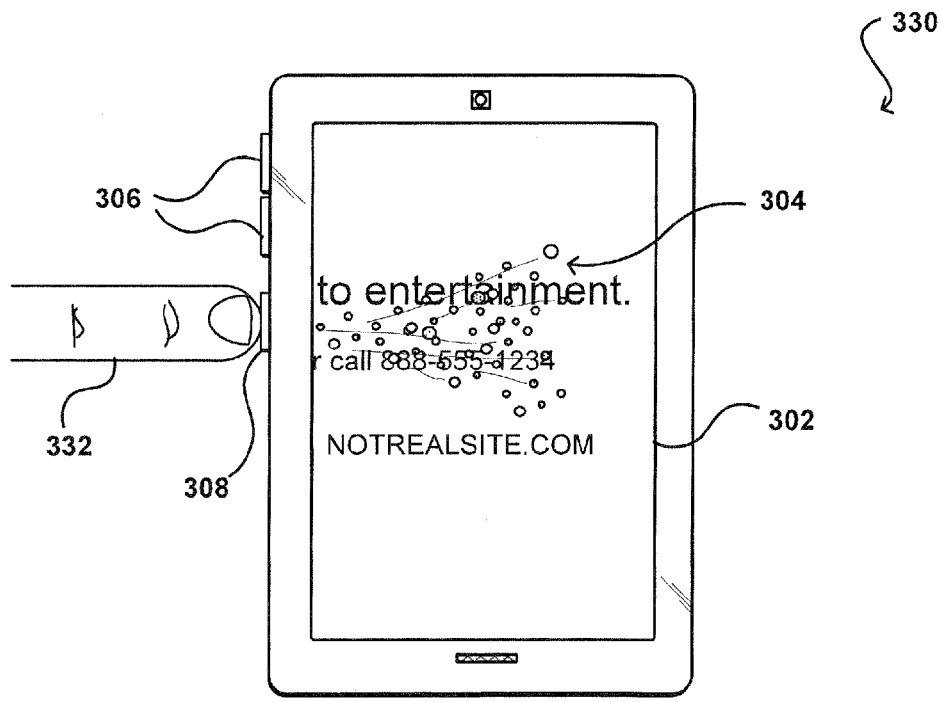
Figure 3E:
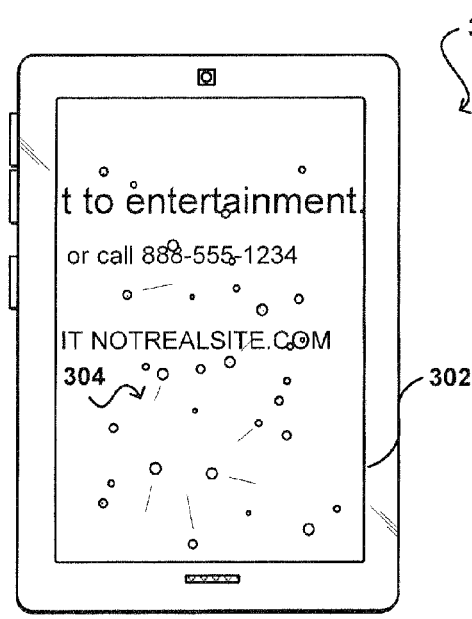
Figure 3F:
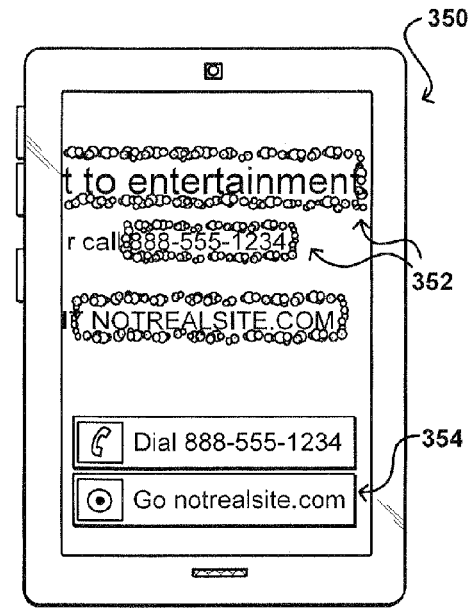
Figure 3G:
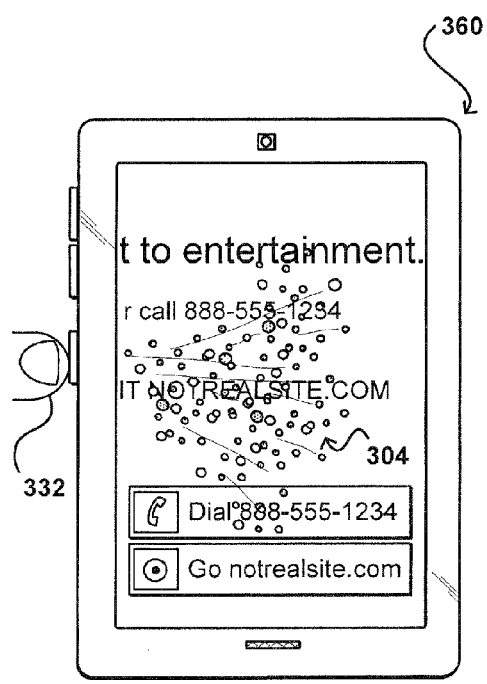
Figure 3H:

In at least some embodiments, the fireflies might first appear when a camera or capture mode is active on a computing device. For example, FIG. 3(a) illustrates an example situation 300 wherein a camera and/or capture mode is activated on the computing device, such as may be the result of a finger 306 of a user selecting a launch button 308 or providing another such input. As illustrated, a "live" view of information being captured by at least one camera of the computing device is displayed on a display screen 302 of a computing device. In this example, a camera interface 304 (or camera "chrome," etc.) can be displayed along with the live view. The interface can include any elements or functions appropriate for image and/or video capture, such as a shutter button, brightness adjustment, flash setting, and the like. In this example, the image includes elements that might be identifiable by the computing device. For example, the device might perform a very light processing of the image to determine whether there are variations in color, brightness, intensity, pixel values, or other such values that indicate something might be recognizable in the image. In this example, a set of fireflies 304 might initially be displayed in a dispersed pattern across the display screen 302, and then quickly be animated or otherwise rendered to appear to move into, proximate, or otherwise be associated with the launch button 308 as illustrated in the example situation 310 of FIG. 3(b). It should be understood, however, that the fireflies 304 might initially be displayed to be associated with the launch button, or might not be initially be displayed, in various other embodiments. In at least some embodiments, the fireflies can be animated to move to a portion of the display proximate the launch button. As used herein, the portion can include an appropriately sized region of the display within a determined distance or range of the launch button, as may vary based upon factors such as the size of the device and physical distance between the launch button and display. The region can be a "bounded" region, in that in at least some embodiments the fireflies do not pass outside the region until an appropriate action is to be taken or a disperse or other such instructions is received. Similarly, the term "proximate" refers to a distance sufficiently near the launch button so as to appear to be associated with the launch button. Again, the distance for the proximity may vary based upon factors such as the size of the device and physical distance between the launch button and display.

If something in the image might be identifiable, or any time a camera mode is active in some embodiments, a set of fireflies 304 might be displayed near a launch button 308 or other user-selectable element of the computing device, as illustrated in the example situation 320 of FIG. 3(*c*). In this example, the launch button 308 is a physical hardware button located near, but separated from, one or more volume buttons 324 or other such inputs. It should be understood, however, that other input elements can be used as a launch button and/or for such purposes as well, such as a multi-purpose button, virtual button, gesture input, motion input, voice command, and the like. The appearance of fireflies 304 near the button 308 and/or otherwise in a ready state can serve a number of different purposes. In some embodiments, the fireflies might be used to indicate to a user that something can be accomplished by pressing the launch button in the current operational mode, or to remind the user that the user can utilize a recognition mode with the current camera view. In other embodiments, the fireflies might be used to indicate to the user that something in the sensor data might be recognizable by the computing device (or a system or service in communication with the device). In still other embodiments, a preliminary analysis might be performed and the presence of fireflies might indicate that at least one object has been recognized. Various other approaches can be used as well within the scope of the various embodiments.

If the user decides to activate the recognition mode, or at least investigate the reason for the fireflies being displayed, the user can activate recognition mode, such as by using a finger 332 to press the launch button 308 on the device as illustrated in the example situation 330 of FIG. 3(*d*). It should be understood that reference numbers for like elements can be carried over between figures for simplicity of explanation, but such usage should not be interpreted as a limitation on the various embodiments unless otherwise stated. As mentioned, various other approaches can be used to activate recognition mode as well in accordance with various embodiments. Upon the button 308 being pressed, the fireflies 304 can be "released" or otherwise caused to appear to emanate from inside, near, or otherwise associated with the launch button and animated or otherwise rendered to appear to disperse across the display screen 302 over the live view. As mentioned, in some embodiments a portion of the fireflies can be animated to move across the display, while other fireflies can flash or appear in various places in order to provide certain realistic behaviors without the appearance of swarming, or a concentrated grouping of fireflies potentially blocking a portion of the live view. In some embodiments, a camera application or other application can be launched directly into a recognition mode by performing a specific action, such as by pressing the launch button or providing another appropriate input for at least a threshold amount of time, such as at least one second.

As discussed with respect to FIG. 2(*a*), the fireflies can be caused to appear to randomly move or hover about the screen, as illustrated in the example situation 340 of FIG. 3(*e*), although in at least some embodiments there can be some level of relationship among the movement to provide a level of realism to the fireflies as a group. While the fireflies are moving about the display, at least a portion of the view is analyzed to attempt to recognize one or more objects represented in the image. In response to recognizing an object in the video, for example, some or all of the fireflies can appear to move to bound the recognized object, such as by creating a bounding box 352 around each identified object as illustrated in the example situation 350 of FIG. 3(*f*). Similarly, the fireflies might be animated to appear to move to a region proximate the representation of the object, where the region as discussed previously might be a bounded region within a determined distance of the object in which the fireflies remain until another appropriate action is to be taken, for example. As mentioned, some of the fireflies might appear to move and some might just appear near an object in at least some embodiments. The result of the fireflies creating a bounding box around an object can indicate to the user that the object, or type of object, has been recognized. If the fireflies had not appeared around the text, but instead continued to move about the display, the user could determine that the image was not sufficient for the device to recognize the object(s) and could perform an action to improve the quality of the captured image and/or video. As discussed previously, a type of each object can also be determined, such as may include an "actionable" or a "non-actionable" type. For each actionable and/or non-actionable object, or at least one recognized actionable object, the interface can provide a ribbon or other user-selectable element associated with that actionable object.

When presented with such options, a user might select or otherwise provide input with respect to one of the ribbons to perform a specific action, or exit the camera application completely, causing the interface to no longer be presented to the user. In some cases, however, the user might instead prefer to return to a camera or capture mode, for example, which can be accomplished by deactivating the recognition mode. In at least some embodiments, a user can again select the launch button 308, or other such element, using a finger 322, stylus, motion, gesture, or other such action or element. As illustrated in the example situation 360 of FIG. 3(*e*), the user again pressing the launch button with a finger 332 can trigger a deactivation of the recognition mode. To confirm the change in mode to the user, the fireflies 304 can appear to fly back into, or near, the launch button 308. As with the emanation illustrated in FIG. 3(*d*), the returning of the fireflies can be illustrated through a portion of the fireflies shown to travel back in the direction of the button, while other fireflies might disappear and then reappear near the button, among other such options. Such usage can help the user to understand when recognition mode is active or not active, and the animation can help the fireflies to seem more realistic to a user. After the fireflies have returned, at least a portion of the fireflies 304 can be illustrated in, or near, the button, as illustrated in the example situation 370 of FIG. 3(*h*). In at least some embodiments, the camera chrome 304 or other portions of the camera interface can once again be displayed on the display screen of the device, in order to further indicate to the user that the device is back in a capture (or equivalent) mode of operation.

As mentioned, it might be the case that the user might not keep one or more recognized objects within the field of view of one of the cameras or otherwise detectable by one or more sensors on the device, such as when the device has recognized an object and the user wants to act on that object using a more comfortable position of the device. Since there may no longer be any objects to bound, the fireflies can scatter or otherwise "randomly" move around the display as previously mentioned, such as with respect to FIG. 3(*e*). As discussed, the fireflies can attempt to find features that might correspond to recognizable objects, as may include edges, corners, sharp transitions of color or brightness, and the like. As discussed, the ribbons for the previously identified objects can remain on the display for at least a period of time. As discussed, this can enable a user to select one of the identified actions whether or not the corresponding object is still detectable by the computing device.

FIGS. 4(a) through 4(d) illustrate another example interface that can utilize fireflies and ribbons to enable a user to perform an action with respect to a recognized object in accordance with various embodiments. In this example, as illustrated in the situation 400 of FIG. 4(a), a user might be interested in obtaining information about a particular item, in this case a book 402. As discussed elsewhere herein, the user can have (or place) the device in a discovery mode, or otherwise have the camera capturing image information that can be analyzed to attempt to recognize one or more objects in a field of view of the camera. In this case, an image of the book 402 is captured by the camera and the image is displayed in the live view on the display of the computing device. As mentioned previously, the device can display a group of fireflies 404 that, at least initially, can move or flash about the display screen at relatively random (or at least somewhat scattered) fashion. In some embodiments, one or more algorithms executing on the device can begin to locate features in the live view that might correspond to recognizable objects. As discussed, these can include things like edges, transitions, end points, and other features or aspects that can be used for tasks such as computer vision and image recognition as known or used in the art. In the example situation 420 illustrated in FIG. 4(b), at least some of the fireflies 422 can begin to move towards at least some of these features as they are identified. For example, since the edges of the book will likely be detected as potential recognizable features, at least some of the fireflies 422 can begin to move and/or appear near the edges of the book. Such an approach can provide the impression that the fireflies are intelligent and are attempting to identify objects in the image. Such an approach also can provide feedback to the user as to the features the device is identifying, in case an object in which the user is interested is not "attracting" fireflies, whereby the user can know to adjust the view, focus, lighting, or some other aspect to attempt to improve the recognition. Once the object is identified, the fireflies can move to create a bounding box 442 or other indication about the recognized object, as illustrated in the example situation 440 of FIG. 4(c). In some embodiments, as illustrated, other portions of the live view can appear to darken, change in color or brightness, or otherwise be modified to further highlight the portion of the image that corresponds to a recognized object. In this example, the object was identified as a book available for purchase, whereby a ribbon 444 is displayed on the display screen. The ribbon in this example includes an image of the book, as may be obtained from a product data store, and the ability to purchase or obtain additional information about the book. In this example, the user is able to select the ribbon 444 to cause the device to navigate to a web page 462 that enables the user to purchase a copy of the book, as illustrated in the example situation 460 of FIG. 4(d). If the user had already purchased a copy of the book in electronic form, for example, the ribbon could instead provide an action that, when selected, causes the e-book to be displayed in an e-book reader application, for example. Various other actions can be taken as well.

In many instances, as mentioned, there can be multiple actions that can be taken. For example, a phone number might be used for text messaging, a voice call, or a video call. If a URL contains a foreign word, actions might include opening the URL in a Web browser or translating the word. Various other actions can apply as well. Accordingly, in at least some embodiments the types of action may be selectable by a user, or the algorithms for suggesting these actions might be ranked or otherwise prioritized. For example, an object being recognized as a URL might always take precedence over the object being identified to contain a foreign term, as the user will be more likely on average to want to follow the URL than to translate it. In some cases, such as where a user can make a voice, video, or VoIP call, for example, the device might analyze the user's historical usage or present the user with options or preferences, for example, that can determine which action to provide to the user in a ribbon. In at least some embodiments, the ribbon can contain an option that enables the user to view other available actions, and select one or more of those actions to be performed.

As discussed, in some embodiments the fireflies can be animated or otherwise rendered to appear on the display screen in a location near a physical button, here a hardware button, used to activate recognition mode. Various other approaches can be used to convey to a user that the user can activate recognition mode, or that it might be advantageous to activate recognition mode at the present time, among other such messages. In an example configuration 500 illustrated in FIG. 5(a), the physical button 502 might have a physical ring or other such element 504 surrounding, or near to, at least a portion of the button. In at least some embodiments, this element is capable of illuminating, such as to light up using the color of the fireflies. This element can function similar to the fireflies collecting near the button, in that the illumination of the element can indicate to a user that it might be advantageous at the current time to enter recognition mode. The illumination can be solid or can vary in intensity, in order to make it appear as if the fireflies are residing in the element at the current time. As illustrated in the example configuration 520 of FIG. 5(b), in some embodiments the button 522 itself can be able to illuminate, or otherwise change color, in order to indicate the ability (or recommendation) to enter recognition mode at the present time. Again, the button 522 can illuminate a solid color, such as the color of a fully illuminated firefly, or can vary in intensity of the firefly color in order to give the impression that the fireflies are residing in the button.

In some embodiments, the button 542 might not be limited to a single color illumination, but instead might be capable of acting as a display element as illustrated in the example configuration 540 of FIG. 5(c). In this example, the button 542 functions like a display screen, in that fireflies can be displayed and/or animated as they would be on the display screen of the device. The fireflies can appear to be in the button when recognition mode can be activated, for example, and when the fireflies are on the screen during recognition mode the fireflies may no longer be shown to reside in the button. In some embodiments, the number of fireflies animated using the button can decrease as the fireflies emanate onto the screen as recognition mode is activated, and can increase as fireflies are animated to return "into" the button across the display screen. For multiple display elements, or portions of a single display element, the fireflies can be rendered to display on any or all of those elements or portions as well within the scope of the various embodiments. For example, in some embodiments, the display portion of the device might wrap at least partially around an edge of the device, such as is illustrated in the example situation 560 of FIG. 5(d). If a portion of the display is proximate the button 502, the fireflies can be animated to move or reside in a more concentrated fashion on the display closer to the button (as compared to portions of the display further from the button). The device may cause this to occur when, for example, recognition mode is available for activation. Various other notification approaches, such as buzzing vibrations or noises, can be used as well within the scope of the various embodiments. In some embodiments, a device can emit specific sounds when the fireflies are in a ready state, when the fireflies emanate, when the fireflies notice something interesting, etc. A firefly sound might also be added to a camera mode to periodically remind a user that the firefly functionality is available. In some embodiments, a single firefly could be added to a camera application and configured to randomly fly around the hardware button to remind the user of the optional functionality.

The fireflies themselves also can take various forms. As discussed, any appropriate graphical elements can be used. For example, as illustrated in FIG. 6(a), the graphical elements 600 can take the form of small points, circles, or spheres, which can change in color, size, intensity, or other such aspects. For three-dimensional displays, the spheres also can appear to be at different depths, and can appear to follow three-dimensional paths. As illustrated in FIG. 6(b), the graphical elements 620 can appear as stars, flashes, or bursts. In FIG. 6(c), the graphical elements 640 can be animated bugs, or other such elements, that can fly or flash across the display. Various other such elements can be used as well within the scope of the various embodiments. In at least some embodiments, a user might be able to modify or configure the type of fireflies used for a particular device, purpose, or mode. For example, a person using his or her device in work mode might select small, point-like fireflies while children might select larger, animated fireflies with moving wings. The types of fireflies might also vary by application or device, and in some embodiments users can download or create other types of fireflies as well.

Figure 7:
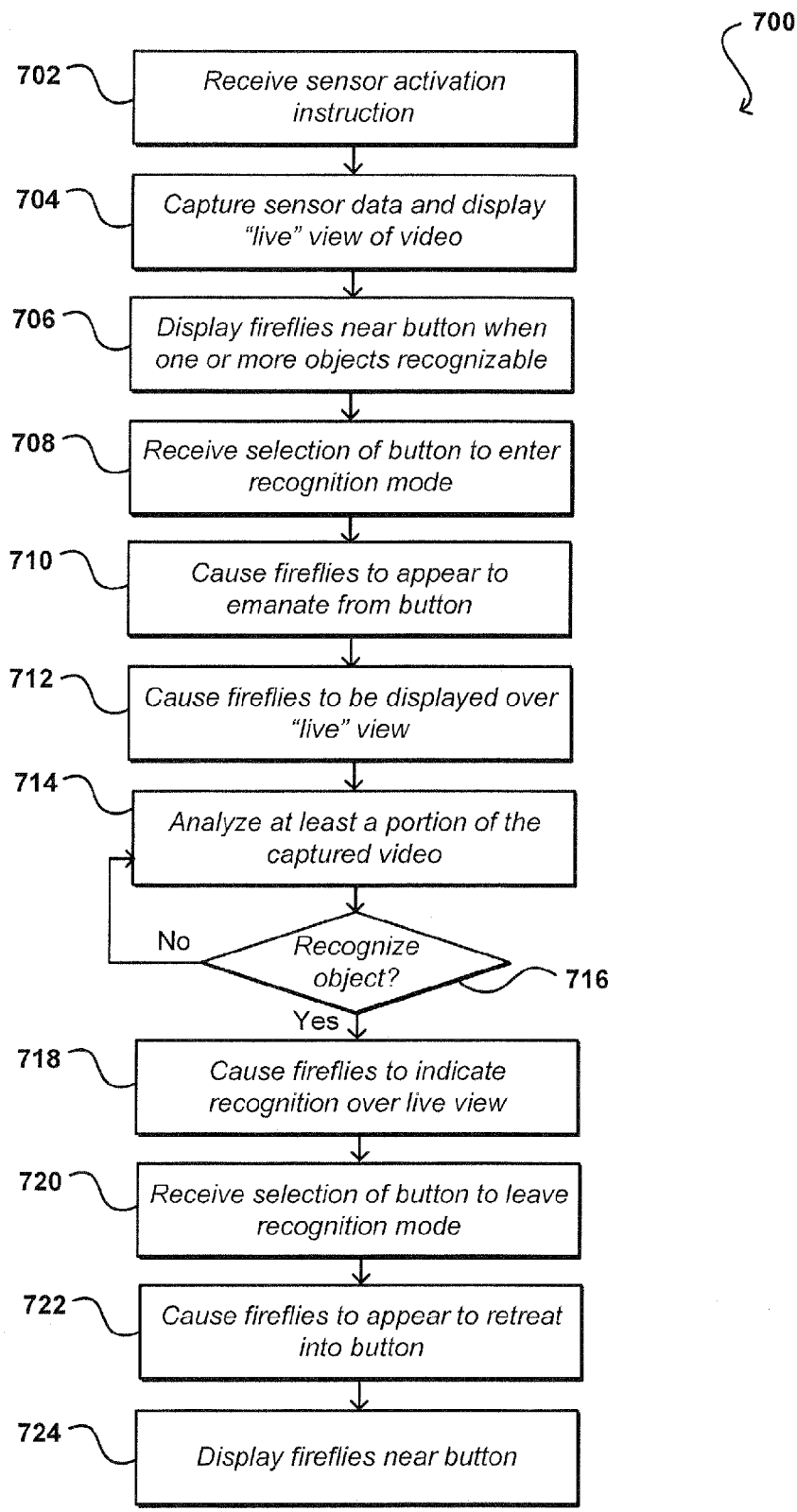
FIG. 7 illustrates an example process for animating graphical elements utilized for object notification and other such tasks in accordance with various embodiments.

FIG. 7 illustrates an example process 700 for animating graphical elements utilized for object notification and other such tasks that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a sensor activation instruction is received 702. This can be a hardware or software instruction generated automatically on a computing device containing one or more sensors, an instruction generated in response to a user input, or another such instruction. In response, the device can capture 704 or otherwise acquire sensor data, which as discussed can include data such as audio data, video data, image data, position data, and the like. The device can also display a "live" view of the captured video on a display of the device, where the live view corresponds to the view of a selected camera as indicated by images captured by that camera and then displayed, with relatively little delay, on a display screen of the device. It should be understood that the "live" view can have a slight delay due to the time needed to capture, read, and provide the image for display. While the live view is being displayed, a group of fireflies can be displayed 706 associated with the launch button or other user-selectable element for activating recognition mode. As discussed, in at least some embodiments the fireflies might only be displayed if one or more objects or aspects of the sensor data are indicative of recognizable objects.

While the sensors are active, in at least some embodiments, a subsequent input corresponding to a launch button can be received 708 that causes the computing device to enter what is referred to herein as a recognition mode, or another such state. While in the recognition mode, the computing device can cause a group of "fireflies" or other such graphical elements to be displayed 710 in such a way as to appear to emanate from the button, or at least an area near or associated with the button. In some embodiments, the fireflies might have appeared dispersed across the screen when a camera application or recognition mode was entered, for example, and then caused to appear to fly near, or into, the launch button. The fireflies once emanating can appear to disperse across the screen, and can be displayed 712 to appear to fly or hover over, or along with, the live view of images captured by the designated camera(s). The live view in some embodiments can include a single image stream from a single camera, multiple image streams from multiple cameras, or a three-dimensional stream from one or more stereoscopic cameras, among other such options. While the fireflies are moving and/or flashing about the display, at least a portion of the sensor data can be analyzed 714 to attempt to recognize at least one object. If an object is not recognized 714, the process can continue. If an object is recognized, at least a subset or group of fireflies can be caused 718 to indicate the recognition, such as to appear to bound the object or form a shape relating to the object in the displayed view. As mentioned, some of the fireflies can appear to move to a bounding box about the item, while other fireflies can appear or flash at the bounding box location, among other such options. During or around the time that the fireflies indicate recognition, the device (or a computing system in communication with the device) in some embodiments can attempt to determine a type of the object. This can include at least whether the object is an actionable object. If the object is determined to be of an actionable type, the type of action for that object can be determined. This can include, for example, an action for dialing a number, emailing or opening an address, identifying a song, or other such actions as discussed and suggested elsewhere herein. Once an action is determined, a user-selectable ribbon or other such element can be generated and displayed, which enables the user to initiate the action with respect to the object. In other embodiments, ribbons can be displayed for any object that is recognized, or a particular subset of the objects, among other such options. If the ribbon is a new ribbon or a previously-generated ribbon that is not currently displayed, the ribbon can be caused to be displayed and the displayed ribbons can be adjusted as appropriate, such as to move the ribbons down or across a stack or arrangement of ribbons, which can be navigable by a user in at least some embodiments.

While the device is in recognition mode, such that fireflies are displayed on the screen, another selection of the launch button can be received 720, which can instruct the device to leave recognition mode (or otherwise change operational state). In response, the fireflies can be caused 722 to appear to retreat into (or near) the button, such as by reversing the emanation process whereby fireflies appear to fly towards the button or flash increasingly near the button. In some embodiments, the fireflies will disappear off screen when recognition mode is deactivated. If so, the fireflies can again be displayed 724 near the button when one or more objects are potentially recognizable, or when it might otherwise be advantageous for the user to activate recognition mode.

Figure 8:
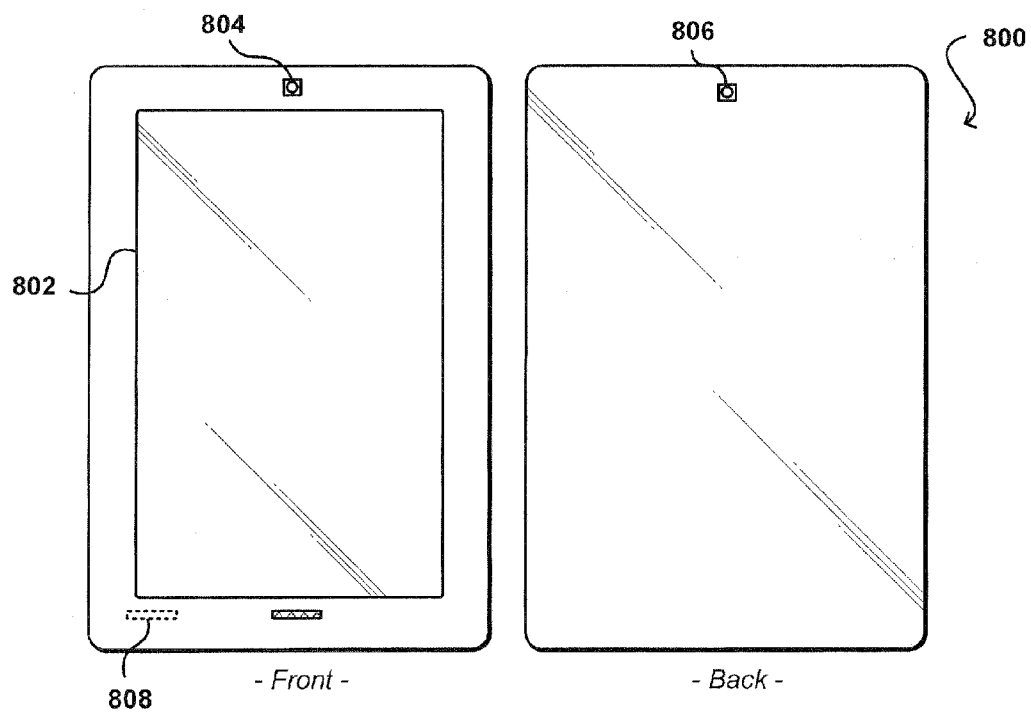
FIG. 8 illustrates an example computing device that can be used in accordance with various embodiments.

FIG. 8 illustrates an example computing device 800 that can be used to perform methods in accordance with various embodiments discussed and suggested herein. In this example, the device has a primary display screen 802 for displaying information and content to a user. The device also has two cameras 804, 806 positioned at the front and back faces of the device, respectively. It should be understood that fewer or additional cameras or other such image capture elements or sensors can be positioned at various other locations on such a device as well. In this example, each capture element is a camera capable of capturing image information over a visible and/or infrared (IR) spectrum, and in at least some embodiments can select between operational modes. It should be understood, however, that there can be fewer or additional elements of similar or alternative types in other embodiments, and that there can be combinations of cameras, infrared detectors, gesture sensors, and other such elements used with various devices.

In this example, a light sensor can be used to determine an amount of light in a general direction of objects to be captured. At least one illumination element, such as a white light emitting diode (LED) or infrared (IR) emitter, can be used to provide illumination in a particular range of directions when, for example, there is insufficient light as determined by the light sensor. In some embodiments, there can be an emitter for each of the image capture elements, with each emitter positioned proximate the respective image capture element. Various other elements and combinations of elements can be used as well within the scope of the various embodiments as should be apparent in light of the teachings and suggestions contained herein. The device can include at least one networking component 808, enabling the device to communicate with at least one remote system or service, such as may be used to identify objects or obtain information relating to identified objects.

Figure 9:
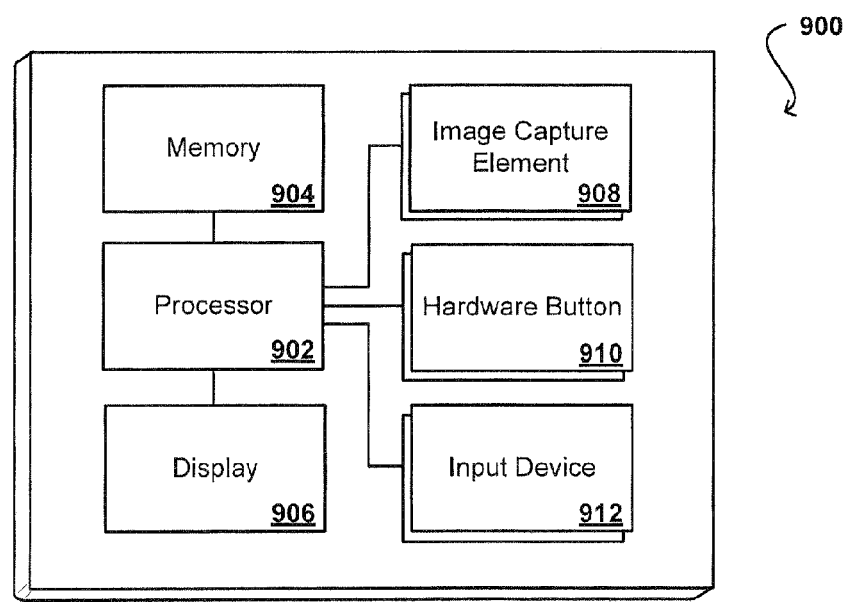
FIG. 9 illustrates an example configuration of components of a computing device such as that illustrated in FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or other type of non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 908, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The example device includes at least one orientation determining component 910, such as an electronic gyroscope used to determine motion of the device for assistance in acquiring focused images. The device also can include at least one illumination element, as may include one or more light sources (e.g., white light LEDs, IR emitters, or flash lamps) for providing illumination and/or one or more light sensors or detectors for detecting ambient light or intensity, etc.

The example device can include at least one additional input device 912 able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 10:
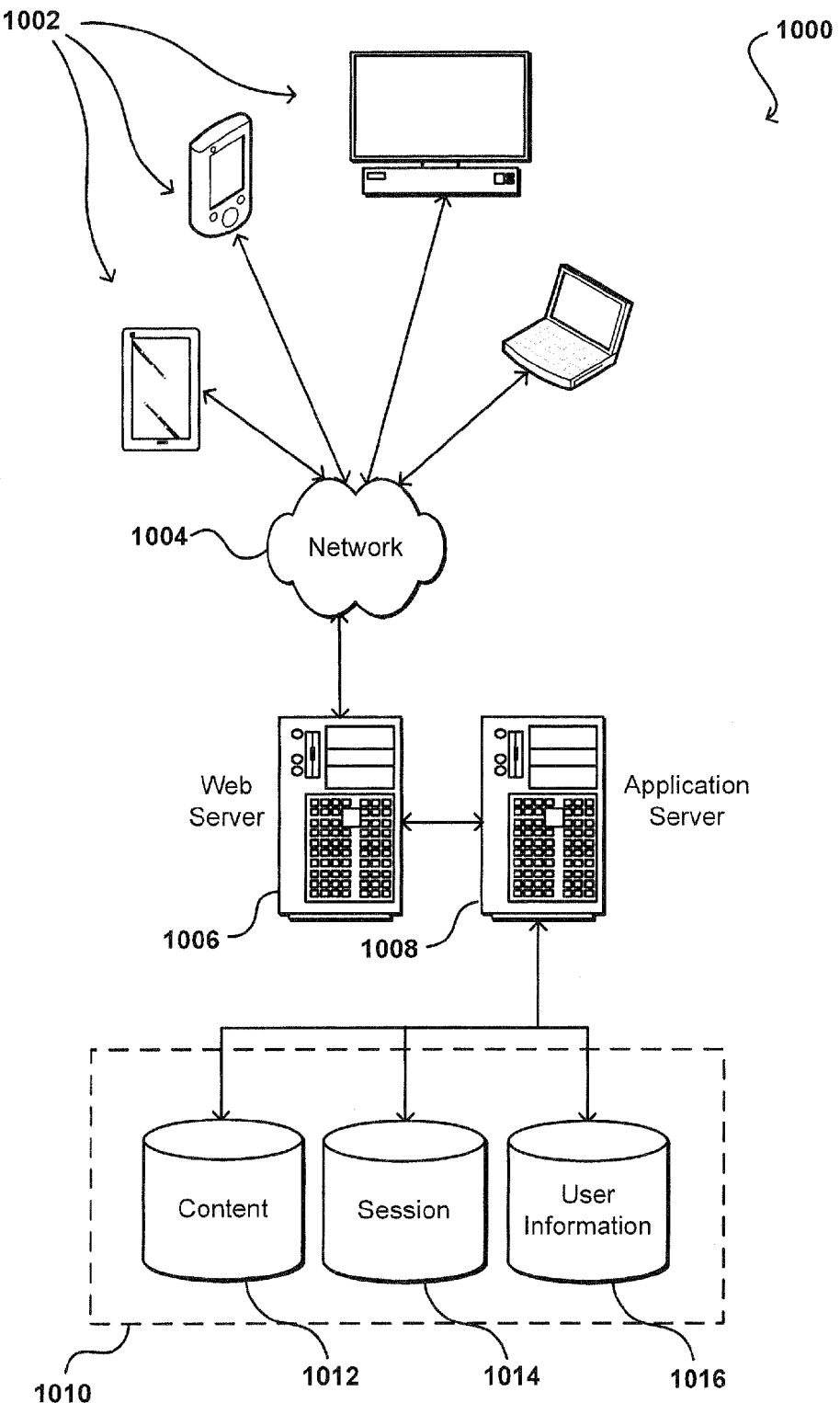
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a camera configured to generate video data;
   a display screen;
   a physical button proximate to a portion of the display screen; and
   memory including instructions that, when executed by the at least one processor, cause the computing device to:
     generate the video data using the camera;
     display video content based on at least a portion of the video data on the display screen;
     display, on the portion of the display screen proximate to the physical button, a plurality of graphical elements at a first time;
     in response to receiving a selection of the physical button at a second time after the first time, causing the plurality of graphical elements to appear to emanate from being bounded from the portion of the display screen to being dispersed across the display screen;
     receive an indication that the video data exhibits characteristics corresponding to a recognizable object;
     causing at least a portion of the graphical elements to appear proximate to a representation of the recognizable object on the display screen; and
     in response to receiving another selection of the physical button, causing the plurality of graphical elements to appear to return to being bounded in the portion of the display screen proximate to the physical button on the display screen.

2. The computing device of claim 1, wherein the instructions when executed further cause the computing device to:
   cause the graphical elements to be animated to appear to be dispersed across at least a region of the display screen upon entering a camera mode of the computing device; and
   cause the plurality of graphical elements to be animated to appear to move to the portion of the display screen proximate to the physical button, indicating that a recognition mode of the computing device is available, wherein the first selection is capable of activating the recognition mode of the computing device.

3. A computer-implemented method, comprising:
   capturing sensor data using at least one sensor of a computing device;
   causing, at a first time, a plurality of graphical elements to be displayed in an animated manner on a display of the computing device, and to appear to be associated with a button of the computing device;
   in response to receiving input corresponding to the button at a second time after the first time, causing the graphical elements to disperse across a display area of the computing device;
   receiving, at a third time after the second time, an indication that the sensor data exhibits characteristics corresponding to a recognizable object; and
   causing the plurality of graphical elements to convey information via the display area, in response to recognizing the recognizable object in the sensor data.

4. The computer-implemented method of claim 3, further comprising:
   receiving a subsequent input corresponding to the button; and
   causing the plurality of graphical elements to be animated to appear to return to being associated with the button.

5. The computer-implemented method of claim 3, wherein:
   capturing sensor data comprises capturing from a camera;
   the graphical elements include a plurality of flashing elements; and
   the method further comprises:
     displaying, on a display area of the computing device, video data generated using the camera, and
     displaying, on the display area, the flashing elements being animated to move across the display and to form a bounding box around a representation of the recognizable object in response to the object being recognized.

6. The computer-implemented method of claim 3, wherein:
   capturing sensor data comprising capturing audio data using a microphone; and
   the method further comprises:
     animating the plurality of graphical elements to convey information at least in part by forming an animated shape indicating that at least a portion of the audio data is recognized.

7. The computer-implemented method of claim 3, wherein causing the plurality of graphical elements to be animated to appear to be associated with the button comprises at least one of:
   illuminating a physical button;
   illuminating a physical element proximate to the physical button;
   displaying an animation on the physical button;
   displaying the graphical elements on a portion of the display area proximate to the physical button;
   displaying the graphical elements proximate to a virtual button on the display area; or
   displaying the graphical elements in the virtual button on the display area.

8. The computer-implemented method of claim 3, further comprising:
   receiving an initial input corresponding to the button; and
   causing the plurality of graphical elements to be displayed on the display area in a portion of the display screen proximate to the button in response to the initial input, wherein at least a portion of a user interface associated with the at least one sensor is removed from the display area while the plurality of graphical elements are displayed.

9. The computer-implemented method of claim 3, further comprising:
causing at least one of a buzzing sound or a vibration to be emitted from the computing device when the plurality of graphical elements are animated to appear to be displayed in a portion of the display screen proximate to the button.

10. The computer-implemented method of claim 3, further comprising:
causing at least one of a buzzing sound or a vibration to be emitted from the computing device when the plurality of graphical elements are animated to appear to be dispersing across at least a portion of the display area.

11. The computer-implemented method of claim 3, wherein the graphical elements are of a type selected from a plurality of different types of graphical elements stored on the computing device.

12. The computer-implemented method of claim 11, wherein the selected type includes a plurality of animated virtual fireflies.

13. A non-transitory computer-readable storage medium storing instructions that, when executed by at least one processor of a computing device, cause the computing device to:
acquire sensor data using at least one sensor of the computing device;
cause a plurality of graphical elements to be displayed on a portion of a display area proximate to a button of the computing device at a first time;
in response to receiving, at a second time after the first time, input corresponding to the button, cause the plurality of graphical elements to appear to emanate from being bounded from the portion of the display area to being dispersed across the display area;
receive, at a third time after the second time, an indication that the sensor data exhibits characteristics corresponding to a recognizable object; and
cause the plurality of graphical elements to be animated to convey information, via the display area, in response to detecting a representation of the recognizable object in the sensor data.

14. The non-transitory computer-readable storage medium of claim 13, wherein the instructions when executed further cause the computing device to:
animate at least a portion of the graphical elements using at least one of different colors, brightness values, intensity values, sizes, motions, speeds, or shapes.

15. The non-transitory computer-readable storage medium of claim 13, wherein the instructions when executed further cause the computing device to:
animate the graphical elements to appear at different depths of a three-dimensional view displayed via the display area.

16. The non-transitory computer-readable storage medium of claim 13, wherein the instructions when executed further cause the computing device to:
receive a subsequent input corresponding to the button; and
cause the plurality of graphical elements to be animated to appear to return to the portion of a display area proximate to the button.

17. The non-transitory computer-readable storage medium of claim 13, wherein the instructions when executed further cause the computing device to:
cause the graphical elements to be animated to appear to emanate from being bounded from a portion of the display screen proximate to the representation of the recognized object to being dispersed across the display area, in response to the recognized object no longer being represented in the acquired sensor data.

18. The non-transitory computer-readable storage medium of claim 13, wherein the instructions when executed further cause the computing device to:
receive an initial selection of the button; and
cause the at least one sensor to begin acquiring the sensor data in response to the initial selection.

19. The non-transitory computer-readable storage medium of claim 13, wherein the instructions when executed further cause the computing device to:
cause a first subset of the graphical elements to appear to move using animation from one location of the display area to another location; and
cause a second subset of the graphical elements to flash at a respective locations of the display area, wherein the elements of the second subset appear to move by disappearing at a first location and appearing at a second location.

* * * * *